UNITED STATES PATENT OFFICE 2,354,695

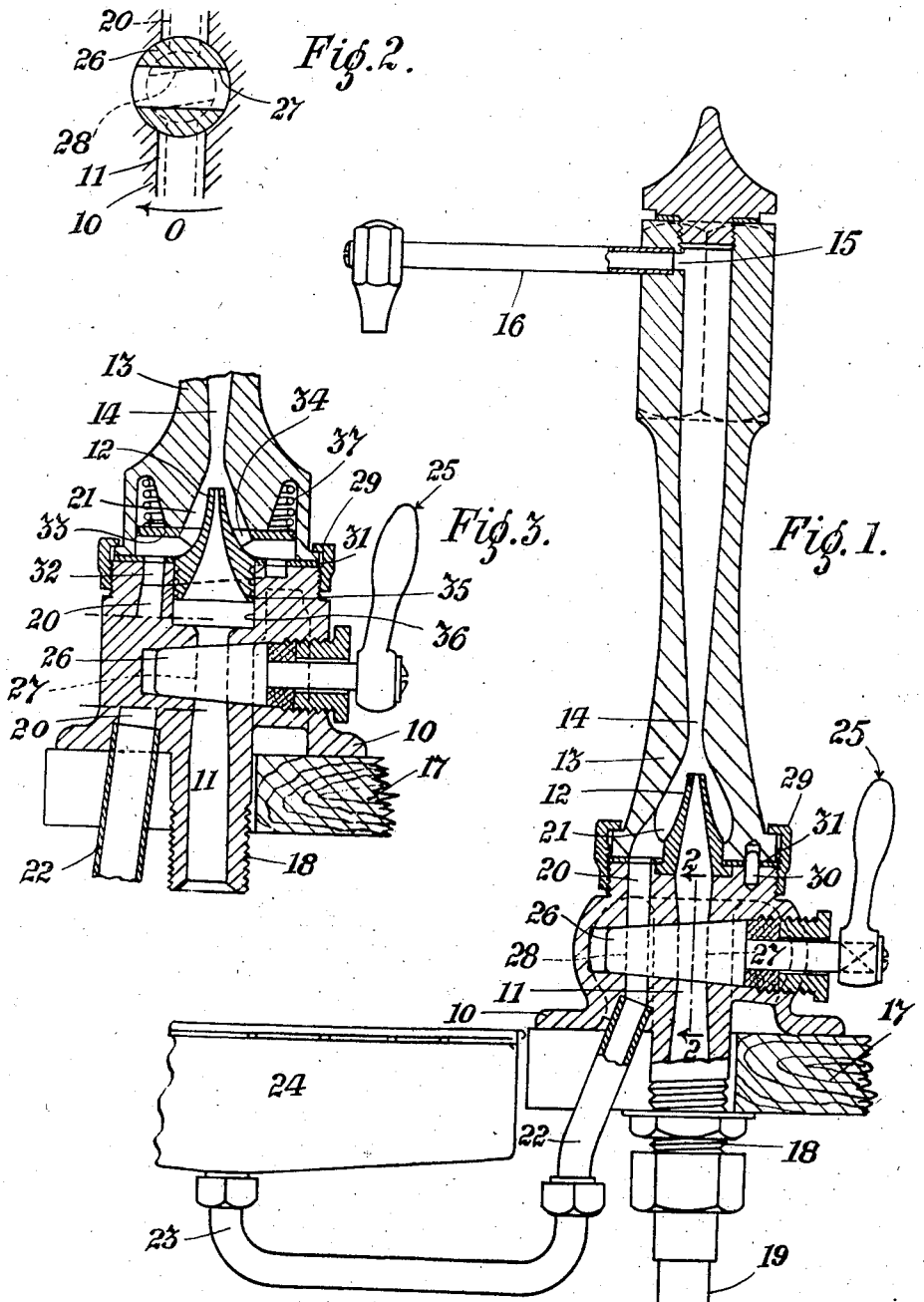

INJECTOR APPARATUS FOR THE RECOVERY OF SPILLED BEER AND LIKE BEVERAGES

Alexander McGlashan, Glasgow, George Wallace Haycock, Giffnock, and James Stark McMeekin, Glasgow, Scotland Application July 30, 1942, Serial No. 452,952
In Great Britain August 27, 1941

14 Claims. (Cl. 225—1)

This invention relates to injector apparatus incorporated in a pressure supply system for the delivery on draught of beer and like alcoholic beverages; that is to say, a system which supplies such a beverage from a source of pressure (for example a barrel subjected to internal pneumatic pressure) to a means of delivery (for example a tap, or "crane" as it is called) such apparatus being for the purpose of recovering any of the beverage spilled at a point of delivery.

A characteristic of beer and like alcoholic beverages, as is well known, is that they are glutinous and glut-forming. If a surface is alternately wet by any such beverage and dried in contact with air, a sticky film forms on the surface. Moreover, if any such beverage has to pass through a conduit where some obstruction to its passage is offered, or where there are spaces or corners in which matter can accumulate, the beverage forms a sticky mass, sometimes known as a "glut," the formation of which is highly undesirable in such a supply system and which moreover tends to clog the system.

Beer and like alcoholic beverages, which are glutinous and glut-forming in character, are referred to in the following specification simply as "beer" and in the claims appended hereto as "beerclass" beverages.

The present invention has for its object to provide for incorporation in a pressure beer supply system including a beer conduit and receptacle for beer spilled at a point of delivery, a beer delivery means comprising a crane, a valve connected to said crane for controlling the delivery, a beer injector connected to said crane at a point between the valve and the point of delivery, and a return conduit from the receptacle to the crane, said injector including a nozzle connectible through the valve to a pressure end of said conduit and discharging to the point of delivery and sucking from the return conduit so that spilled beer can pass therethrough to said injector for entrainment with beer being forced through the crane.

Another object is to provide an apparatus in which the entire delivery means, comprising the crane, control valve and injector, are assembled as a single structural unit ready for connection as such in a supply system. That is to say, the beer delivery means comprises a crane, which is provided with an injector and which is formed internally as a diffuser to said injector, a valve for controlling the supply of beer under pressure to said injector, and a return conduit communicating with the suction zone of said injector.

Another object is to provide a crane comprising a pillar which is formed axially as the diffuser, and a counter base which is fitted with or connected to the injector nozzle, and contains the control valve.

Another object is to provide an apparatus in which the return conduit is valved and the valve action is got from an auxiliary valve integral with or coupled to the control valve, so that when the latter is opened or closed the auxiliary valve is correspondingly opened or closed in unison. That is to say, when the control valve is turned to cause delivery of beer, the return conduit is opened for the return of spilled beer to the system; and when the control valve is closed, any beer still in the crane will be trapped therein by the now closed auxiliary valve.

Yet another object is to provide an alternative arrangement of apparatus in which the return conduit is valved and an automatic valve action is got by mounting the injector nozzle for displacement under the force of the beer when the control cock is opened and to return to a rest position when the control valve is closed, and by providing the nozzle with a valve component which in said rest position closes the return conduit.

Embodiments of the invention will now be described with reference to the accompanying drawing, in which—

Fig. 1 is a sectional elevation of a pillar-type crane in or for a beer delivery means according to the invention, the control valve of the crane being shown open.

Fig. 2 is a fragmentary section which is drawn to a larger scale on the line 2—2 of Fig. 1 but which shows the control valve closed.

Fig. 3 is a fragmentary section corresponding to Fig. 1 but showing a modification.

Referring to Fig. 1, the pillar-type crane therein shown comprises a base 10 formed axially with a beer-supply conduit 11 and carrying internally the nozzle 12 of a hydro-dynamic injector. Surmounting the base is a hollow pillar 13 which is formed axially at 14 with a convergent-divergent bore to function as the diffuser of the injector and which at its upper end has a lateral port 15 leading to the crane outlet arm 16. The base (as in usual practice) is mounted on the bar counter 17 and its supply branch 18 is connected to the beer supply pipe 19 thereby connecting the nozzle 12 to the source (not shown) of pressure beer supply.

The return conduit is constituted by a port or chamber 20 formed in the base and opening on top into the convergent suction intake zone 21 of the injector into which zone the nozzle 12 projects. The port 20 opens below into a pipe 22 connected to a drain 23 in the bottom of the spilled-beer receptacle 24.

The control valve of the crane consists of a cock 25 provided in the base beneath the nozzle, that is on the supply side of same, and the plug 26 of the cock is provided with two ports 27 and 28 respectively registrable with the supply and return conduits 11 and 20.

The pillar 13 is secured to the base 10 by a union nut 29. A dowel pin 30 maintains proper register between the parts 10 and 13 and a washer 31 makes joint between them.

In operation of the crane, when the cock 25 is turned by its handle to open the crane, beer flows under pressure through the nozzle 12 and diffuser 14 of the injector and thence from the outlet arm 16, and previously spilled beer in the receptacle 24 passes to the injector through the return conduit 20, whence the returned beer becomes entrained by the beer being forced through the injector from the supply pipe 19.

When the control cock 25 is turned to close the crane, the supply of beer to the outlet arm 16 is cut off and the return conduit 20 is closed, thereby preventing beer contained in the crane from flowing into the receptacle 24.

The two ports 27 and 28 in the plug 26 may as shown by Fig. 2 be at a slight angle to each other, as viewed in the direction of the plug axis, so that when the cock is turned in the direction of arrow 0 the supply conduit 11 is opened in advance of the return conduit 20, thus building up suction sufficient to act instantly to withdraw beer from the receptacle 24 whenever the port 28 opens. Conversely, when the cock is returned the return conduit is closed in advance of the supply conduit, thus obviating or mitigating the possibility of beer flowing to the spilled beer receptacle.

Reference has been made hereinbefore to the glutinous and glut-forming character of beer. In the construction shown, the port 28 controlling the return conduit is positively opened and closed in precise timed relationship with the port 27 controlling the supply conduit, so that there is no possibility of the supply being fully opened (or closed) whilst the return remains closed (or open). Moreover, all internal surfaces in and around the nozzle 12 and plug 26 are streamlined, being smooth curves swept by the beer itself in its passage through the base 10 and pillar 13 (or by water or other cleansing liquid which may be passed in the usual way at intervals through the system) and there is therefore no possibility of glut accumulating on said surfaces.

Referring now to Fig. 3, the same reference numerals are again used to indicate similar or corresponding parts. The view is composite in so far as concerns the base 10; that is to say, in the base as made, the axis of the plug 26 is in a vertical plane which is perpendicular to the vertical plane containing the axis of the return conduit 20; whereas both the plug and the return conduit are drawn as though their axes occupied the same vertical plane.

In the embodiment according to Fig. 3, the plug 26 has one port only, namely the port 27 which is registrable with the beer supply conduit 11 in the base of the crane. The nozzle 12 itself is arranged to control the return conduit 20, which opens into an annular channel 32 in the base. The nozzle carries an annular valve 33 arranged to close said channel, said valve in the example being made integral with the nozzle and being secured thereto by spaced spider arms 34. The nozzle and valve are parts of an axially displaceable unit, another part of which is a pistonlike body 35 coaxial with both the nozzle and valve. The body 35 is slidable in a cylinder 36 formed in the base. A spring 37 urges the nozzle-valve-piston unit into a rest position in which the return conduit is closed by the valve. Thus, when the crane is closed by its control cock 25, the annular valve 33 prevents flow of beer from the crane to the spilled beer receptacle. When the crane is opened as shown in Fig. 3, the pressure of the beer on the nozzle forces the aforesaid unit against the spring pressure to its upper (working) position, thereby opening the annular channel and return conduit to the suction zone of the injector.

It will be noted that the opening motion of the valve is effected by the pressure in the supply-conduit 11 when the port 27 is open and that the closing motion is effected by the spring 37 when said port is closed. That is to say, the said opening and closing motions are effected by forces separate and distinct from any action of suction in the zone 21 or of beer in the return conduit 20, 32.

Various modifications within the scope of the invention may be made. For instance, in the first embodiment herein described instead of having the control valve made as a one-plug cock with two ports for the purposes referred to, separate plug cocks for both purposes may be provided, such plug cocks preferably being operatively inter-connected; or the second valve or port controlling the return conduit leading to the suction zone of the injector may be dispensed with, in which case after each operation of the crane the relatively small quantity of beer contained in it will flow from it towards the spilled beer receptacle.

Strainers may be included in the apparatus for the purpose of straining the beer passing through the crane from the source of supply and from the aforementioned receptacle, and also for the purpose of protecting the injector from chokage.

We claim:

1. In combination with a receptacle for spilled beerclass beverage, a beerclass beverage delivery means comprising a crane with an outlet directed downwards towards the receptacle, an injector incorporated in said crane, a valve on said crane for controlling the supply of beverage under pressure to said injector, a conduit connected with said injector for leading beverage into the crane from the receptacle, and an auxiliary valve arranged in said conduit and connected to the valve aforesaid to open and close substantially in unison therewith.

2. In combination with a receptacle for spilled beerclass beverage, a beerclass beverage delivery means comprising a crane with an outlet directed downwards towards the receptacle, an injector nozzle in said crane, a convergent-divergent bore in said crane to function as diffuser for said nozzle and to provide a suction intake zone, a valve on said crane for controlling the supply of beverage under pressure to said nozzle, a conduit connected with said suction intake zone for leading beverage into the crane from the receptacle, and an auxiliary valve arranged on said crane to control said conduit and connected to the valve aforesaid to open and close substantially in unison therewith.

3. In combination with a pressure supply system including a beerclass beverage conduit and a receptacle for beverage spilled from said system, a beerclass beverage delivery means comprising a crane pillar, an outlet branch on said pillar, a convergent-divergent bore formed axially in said pillar, a base on which said pillar stands, an injector nozzle internally located in relation to said base and pillar and directed into said bore, a return conduit connected between the receptacle and the foot of said bore, and a double valve in said base connected to said conduits for controlling the passage of beverage therethrough, said nozzle being arranged to discharge beverage through said bore towards said outlet branch and by so doing to suck from said return conduit when said double valve is operated to open both conduits.

4. In combination with a receptacle for spilled beerclass beverage, a beerclass beverage delivery means comprising a crane, an injector incorporated in said crane, said injector including a movable nozzle, a main valve on said crane for controlling the supply of beverage under pressure to said injector, a conduit connected with said injector for leading beverage into the crane from the receptacle, and an auxiliary valve arranged in said conduit and connected to said nozzle to open and close said conduit automatically when said main valve is opened and closed.

5. In combination with a receptacle for spilled beerclass beverage, a beerclass beverage delivery means comprising a crane, an injector nozzle movably mounted in said crane, a convergent-divergent bore in said crane to function as a diffuser for said nozzle and to provide a suction intake zone, a main valve on said crane for controlling the supply of beverage under pressure to said nozzle, a conduit connected with said suction intake zone for leading beverage into the crane from the receptacle, an auxiliary valve arranged in said conduit and provided on said nozzle to open under the pressure of the supply beverage substantially in unison with the main valve, and spring means for closing said auxiliary valve.

6. A beerclass beverage delivery means comprising a crane pillar, an outlet branch on said pillar, a convergent-divergent bore formed axially in said pillar to function as an injector diffuser and to provide a suction intake zone, a base connected to said pillar, an injector nozzle internally located in relation to said base and pillar and directed into said bore, a conduit connected with said suction intake zone for leading beverage into the crane from the exterior thereof for entrainment with beverage supplied under pressure to and discharged by the nozzle through the diffuser to the outlet branch, a main valve in said base for controlling the supply of beverage under pressure to said injector nozzle, an auxiliary valve between said base and pillar for controlling the passage of beverage through said conduit, said auxiliary valve opening said conduit under the pressure of the beverage supplied to the nozzle, and spring means for returning the auxiliary valve to close said conduit.

7. In combination with a receptacle for spilled beerclass beverage, a beerclass beverage delivery means comprising a crane with an outlet directed downwards towards the receptacle, a bore in said crane with a convergent portion to function as a suction zone, an injector nozzle directed into said convergent portion, a conduit connected with said suction intake zone for leading beverage thereinto from the receptacle, a valve on said crane for controlling supply of beverage under pressure to said nozzle, and an additional valve on said crane to control said conduit said additional valve being mechanically connected to said supply-controlling valve to open and close by manual force applicable thereto and in which said valves are in fixed corelationship such that the supply-controlling valve is opened slightly in advance of and closed slightly later than said additional valve.

8. In combination with a receptacle for spilled beerclass beverage, a beerclass beverage delivery means comprising a crane with an outlet directed downwards towards the receptacle, a bore in said crane with a convergent portion to function as a suction zone, an injector nozzle directed into said convergent portion, a conduit connected with said suction intake zone for leading beverage thereinto from the receptacle, a valve on said crane for controlling supply of beverage under pressure to said nozzle, an additional valve on said crane to control said conduit, a spring applying a closing force to said additional valve, and a movable unit of which said nozzle and said additional valve are parts, said unit being arranged to be pressed upon by said beverage under pressure on opening of said supply-controlling valve and thus moved to open said additional valve in opposition to said spring.

9. The combination of a pressure supply system including a beerclass beverage supply conduit and a receptacle for beverage spilled from said system at a point of delivery with a beerclass beverage delivery means comprising a crane whose outlet constitutes said point of delivery, said outlet being directed downwards to the receptacle, an injector nozzle in said crane, a convergent-divergent bore in said crane to function as a diffuser for said nozzle and to provide its convergent portion as a suction intake zone, said bore having streamline internal form and being arranged so that its convergent portion surrounds said nozzle, a valve on said crane for controlling the supply of beverage under pressure through said conduit to said nozzle, a return conduit for spilled beverage leading from said receptacle to said suction intake zone, and an additional valve on said crane to control said return conduit, said additional valve being mechanically connected to said supply-controlling valve to open and close by manual force applicable thereto and said valves being in fixed corelationship such that the supply-controlling valve is opened slightly in advance of and closed slightly later than said additional valve.

10. The combination of a pressure supply system including a beerclass beverage supply conduit and a receptacle for beverage spilled from said system at a point of delivery with a beerclass beverage delivery means comprising a crane whose outlet constitutes said point of delivery, said outlet being directed downwards to the receptacle, an injector nozzle in said crane, a convergent-divergent bore in said crane to function as a diffuser for said nozzle and to provide its convergent portion as a suction intake zone, said bore having streamline internal form and being arranged so that its convergent portion surrounds said nozzle, a valve on said crane for controlling the supply of beverage under pressure through said conduit to said nozzle, a return conduit for spilled beverage leading from said receptacle to said suction intake zone, an additional valve on said crane to control said return conduit, a spring applying a closing force to said additional valve, and a movable unit of which said nozzle and said additional valve are parts, said unit being arranged to be pressed upon by said beverage under pressure on opening of said supply-controlling valve and thus moved to open said additional valve in opposition to said spring.

11. A beerclass beverage delivery means comprising a crane, an injector incorporated in said crane, a valve on said crane for controlling the supply of beverage under pressure to said injector, a conduit connected with said injector for returning beverage spilled from said supply into the crane, and an additional valve mechanically connected to said supply-controlling valve in fixed corelationship such that the supply-controlling valve is opened slightly in advance of and closed slightly later than said additional valve.

12. In combination with a receptacle for spilled beerclass beverage, a beerclass beverage delivery means comprising a crane pillar extending above said receptacle, an outlet branch on said pillar downwardly directed to said receptacle, a bore formed axially in said pillar to function as an injector diffuser and to provide a convergent suction intake zone, an injector nozzle projecting into said zone, a valve on said pillar for controlling the supply of beverage under pressure to said injector nozzle, and a conduit connected with said suction intake zone for leading beverage into the crane from the receptacle for entrainment with beverage discharged by the nozzle through the diffuser to the outlet branch.

13. In combination with a receptacle for spilled beerclass beverage, a beerclass beverage delivery means comprising an upright crane pillar, an outlet branch on said pillar downwardly directed to said receptacle, a convergent-divergent bore formed axially in said pillar with streamline internal contour to function as an injector diffuser and to provide a suction intake zone, a base connected to said pillar, an injector nozzle internally located in relation to said base and pillar and projecting into the convergent portion of said bore, a valve in said base for controlling the supply of beverage under pressure to said injector nozzle, and a conduit connected with said suction intake zone for leading beverage into the crane from the receptacle for entrainment with beverage discharged by the nozzle through the diffuser to the outlet branch.

14. In combination with a pressure supply system including a beerclass beverage conduit and a receptacle for beverage spilled from said system at a point of delivery, a beerclass beverage delivery means comprising a crane whose outlet constitutes said point of delivery, said outlet being directed downwards to the receptacle, an injector nozzle in said crane, a bore in said crane with a convergent portion to function as a diffuser for said nozzle and to provide a suction intake zone, said bore having streamline internal form and being arranged so that its convergent portion surrounds said nozzle, a valve fitted in said crane for controlling the delivery of beverage from said conduit to said nozzle, and a return conduit connected between the receptacle and said suction intake zone, said nozzle being arranged to discharge through said bore towards said outlet beverage supplied to the nozzle through said valve and by so doing to suck spilled beverage through said return conduit for entrainment with the beverage going through said bore.

ALEXANDER McGLASHAN.
GEORGE WALLACE HAYCOCK.
JAMES STARK McMEEKIN.